United States Patent
Jia et al.

(10) Patent No.: US 11,575,780 B1
(45) Date of Patent: Feb. 7, 2023

(54) WIRELESS TECHNOLOGY INDICATOR DISPLAY

(71) Applicant: AT&T Intellectual Property I, L.P., Atlanta, GA (US)

(72) Inventors: Yupeng Jia, Austin, TX (US); Inderpreet Ahluwalia, Austin, TX (US); Jinhong No, Issaquah, WA (US); Jason Sikes, Carnation, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/405,411

(22) Filed: Aug. 18, 2021

(51) Int. Cl.
  *H04M 1/724* (2021.01)
  *H04W 36/00* (2009.01)

(52) U.S. Cl.
  CPC ...... *H04M 1/724* (2021.01); *H04W 36/00835* (2018.08)

(58) Field of Classification Search
  CPC .................. H04W 36/00835; H04M 1/724
  See application file for complete search history.

(56) References Cited

U.S. PATENT DOCUMENTS

| | | | |
|---|---|---|---|
| 10,952,132 B2 | 3/2021 | Ahluwalia et al. | |
| 11,064,064 B2 | 7/2021 | Ahluwalia et al. | |
| 2008/0039097 A1* | 2/2008 | Sathyanarayan | H04W 28/02 455/442 |
| 2009/0303941 A1 | 12/2009 | Naka et al. | |
| 2011/0211541 A1 | 9/2011 | Yuk et al. | |
| 2013/0337811 A1 | 12/2013 | Faerber et al. | |
| 2018/0279309 A1 | 9/2018 | Takahashi et al. | |

(Continued)

FOREIGN PATENT DOCUMENTS

CN    107852203 B  *  4/2021  ............. H04B 7/046

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)." 3rd Generation Partnership Project; Apr. 2019. 948 pages.

(Continued)

*Primary Examiner* — Ankur Jain
*Assistant Examiner* — Angelica M Perez
(74) *Attorney, Agent, or Firm* — Amin, Turocy & Watson, LLP

(57) ABSTRACT

An indicator (e.g., "5G+" or "5G") displayed on a mobile device is based on whether the mobile device is connected in or (if idle) has the potential of connecting in a high channel bandwidth frequency band (e.g., n77 or mmWave). An accurate indication is displayed when the mobile device is connected, or when idle and the aggregated bandwidth is not directly known, such as when anchored to a lower bandwidth cell. When in idle mode, the mobile device can maintain cell identifiers ("fingerprints") and determine a location estimated to be within a high bandwidth cell, to thereby determine potential high bandwidth operation (e.g., and display 5G+) when connected. When in the idle mode, the mobile device can evaluate neighbor cells including if within a high channel bandwidth cell's coverage to decide whether to select "5G+" or "5G" for display to indicate the potential high bandwidth operation (or not) when connected.

20 Claims, 12 Drawing Sheets

(56) References Cited

U.S. PATENT DOCUMENTS

| | | |
|---|---|---|
| 2018/0368086 A1 | 12/2018 | Bai et al. |
| 2019/0053175 A1 | 2/2019 | Kubota et al. |
| 2019/0069205 A1 | 2/2019 | Lee et al. |
| 2020/0029377 A1 | 6/2020 | Chow et al. |
| 2020/0396676 A1* | 12/2020 | Ahluwalia ............ H04W 48/14 |
| 2021/0075901 A1* | 3/2021 | Ahluwalia ........... G06F 3/04817 |
| 2021/0195510 A1 | 6/2021 | Ahluwalia et al. |
| 2021/0281672 A1 | 9/2021 | Ahluwalia et al. |

OTHER PUBLICATIONS

Ericsson. "5G indicator for EN-DC." 3GPP TSG-RAN WG2 #100, Reno, Nevada, USA, Nov 27,-Dec. 1, 2017. 21 pages.

Qualcomm Incorporated, et al. "Consideration on the GSMA NR indication requirements." 3GPP TSG-RAN WG2 Meeting #101. Athens, Greece, Feb. 26-Mar. 2, 2018. 3 pages.

Notice of Allowance received for U.S. Appl. No. 16/441,550 dated Nov. 12, 2020, 29 Pages.

Non Final Office action received for U.S. Appl. No. 16/567,819 dated Nov. 3, 2020, 22 Pages.

Office Action dated Jul. 22, 2022 for U.S. Appl. No. 17/173,847, 20 pages.

\* cited by examiner

WIRELESS TECHNOLOGY INDICATOR DISPLAY

TECHNICAL FIELD

The subject application is related to wireless communication systems, and, for example, to displaying an indication of available wireless technology corresponding to available bandwidth, and related embodiments.

BACKGROUND

For fifth generation (5G) new radio, the third generation partnership project (3GPP) provides defined standards, including for 5G standalone and non-standalone 5G-LTE (long term evolution) architectures. With respect to the non-standalone operating mode, 3GPP has defined an information element (IE) "upperLayerIndication" to indicate to user equipment that a cell is capable of supporting LTE-NR dual connectivity, which the user equipment uses to display a "5G" icon. For standalone mode, the 3GPP defined frequency band information in the system information element provides a similar indication.

However, 5G operators provide different levels of 5G service, including what is considered standard 5G, and enhanced 5G having higher bandwidth, such as including what is referred to as "5G+" and 5G ultra-wideband technologies. The information that is provided according to the 3GPP standards does not provide sufficient granularity for operators who wish to differentiate their 5G services that result from different frequency bands/channel bandwidth.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
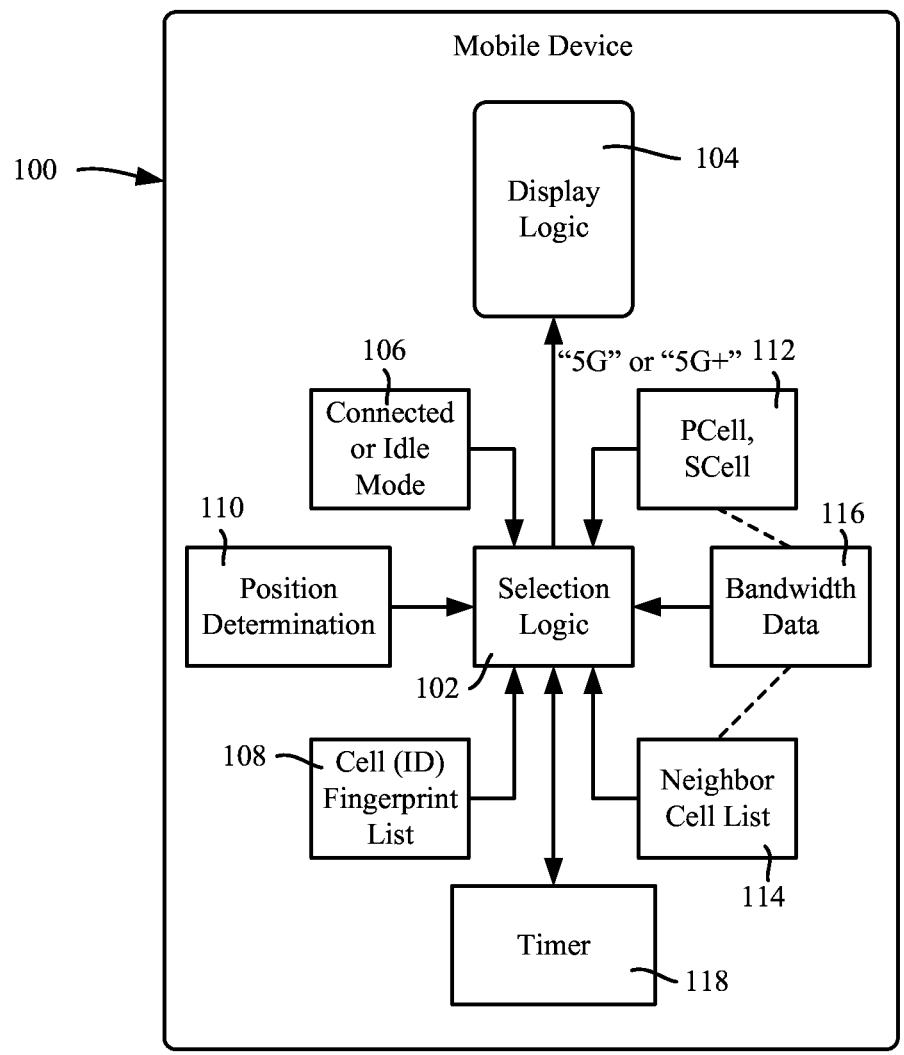
FIG. 1 illustrates an example mobile device that can select a wireless technology icon to display, in accordance with various aspects and embodiments of the subject disclosure.

Various aspects of the technology described herein are directed towards providing an indicator of enhanced 5G service (e.g., a "5G+" icon or the like) on a mobile device (user equipment) when the mobile device is capable of operating in a frequency band with a correspondingly high channel bandwidth, for example when the available aggregated bandwidth meets a defined (e.g., operator-defined) bandwidth threshold. As will be understood, the technology operates to provide the indication when the mobile device is in the connected mode and the aggregated bandwidth is known, as well as when the mobile device is in the idle mode and the aggregated bandwidth is not directly known. This includes scenarios in which the device is in the idle mode and is anchored to a lower bandwidth (e.g., LTE) cell, based on a higher bandwidth cell being known to the device as being available if and when changed to operate in the connected mode.

In one implementation, the mobile device maintains cell identifiers "fingerprints" obtained from previously being connected in a cell with sufficient bandwidth to meet the threshold bandwidth (self-learning), or obtained in other ways, e.g., via neighboring devices. When a mobile device in idle mode is appropriately positioned within a such a cell, the device will display the enhanced 5G icon; (for purposes of brevity herein, the enhanced 5G icon will be referred to as a "5G+" icon, in contrast to the "5G" icon (without the "+" character) specified in the 3GPP standards; however it is understood that this is only one non-limiting example).

In another implementation, when in the idle mode the mobile device evaluates neighbor cell(s) obtained via a neighbor cell list. Based on the cell frequency band/bandwidth to which the mobile device is anchored while idle and the potential aggregated bandwidth of the neighbor cell(s) in the neighbor cell list, logic in the mobile device logic decides whether to select the "5G+" or "5G" icon for display.

It also should be understood that any of the examples and terms used herein are non-limiting. For instance, the examples are based on New Radio (NR, sometimes referred to as 5G) communications between a user equipment exemplified as a smartphone or the like and network device; however virtually any communications devices (user and network) including 6G and beyond may benefit from the technology described herein. Thus, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that the solutions outlined applies for Multi RAB (radio bearers) on some carriers (that is data plus speech is simultaneously scheduled).

FIG. 1 illustrates an example mobile device (user equipment) 100 comprising components (e.g., built into the operating system) or the like coupled to various data as described herein. The example device comprises selection logic 102 that determines, based on various data, whether to output a 5G icon or 5G+(or the like) icon to display logic 104 that outputs to the device display as described herein. As will be understood, the selection logic 102 is aware whether the mobile device 100 is in the connected mode or the idle mode (block 106).

Note that some current 5G devices have the following output displayed based on the current frequency band and the device's idle versus connected state:

| Frequency Band | Mode | Display |
| --- | --- | --- |
| Sub6 (FR1) | idle | 5G |
| Sub6 (FR1) | connected | 5G |
| mmW (millimeter wave, FR2) | idle | 5G |
| mmW (millimeter wave, FR2) | connected | 5G+ |

As can be seen, such existing devices when idle and appropriately located are capable of operating in the FR2 band as soon as connected, yet still display "5G" (rather than "5G+"), which can be considered to be somewhat misleading, as far more potential bandwidth is available upon entering the connected state. Further, as new spectrum is becoming available for cellular communications, such as the n77 frequency band in the C-band spectrum, for example, significantly higher bandwidth will be often available to n77-capable (or the like) mobile devices. The technology described herein operates to more granularly indicate the technology (e.g., "5G" or "5G+") corresponding to the available bandwidth, including the potentially available bandwidth when in the idle state. Moreover, even when in an idle state anchored to a low bandwidth (e.g., LTE or non-n77) cell, when 5G is available with high aggregated bandwidth, such as with operation including the n77 band or the FR2 band, as described herein the device can display the enhanced "5G+" icon based on the potential bandwidth that (likely) will be available should the (formerly) idle device become connected.

Figure 2:
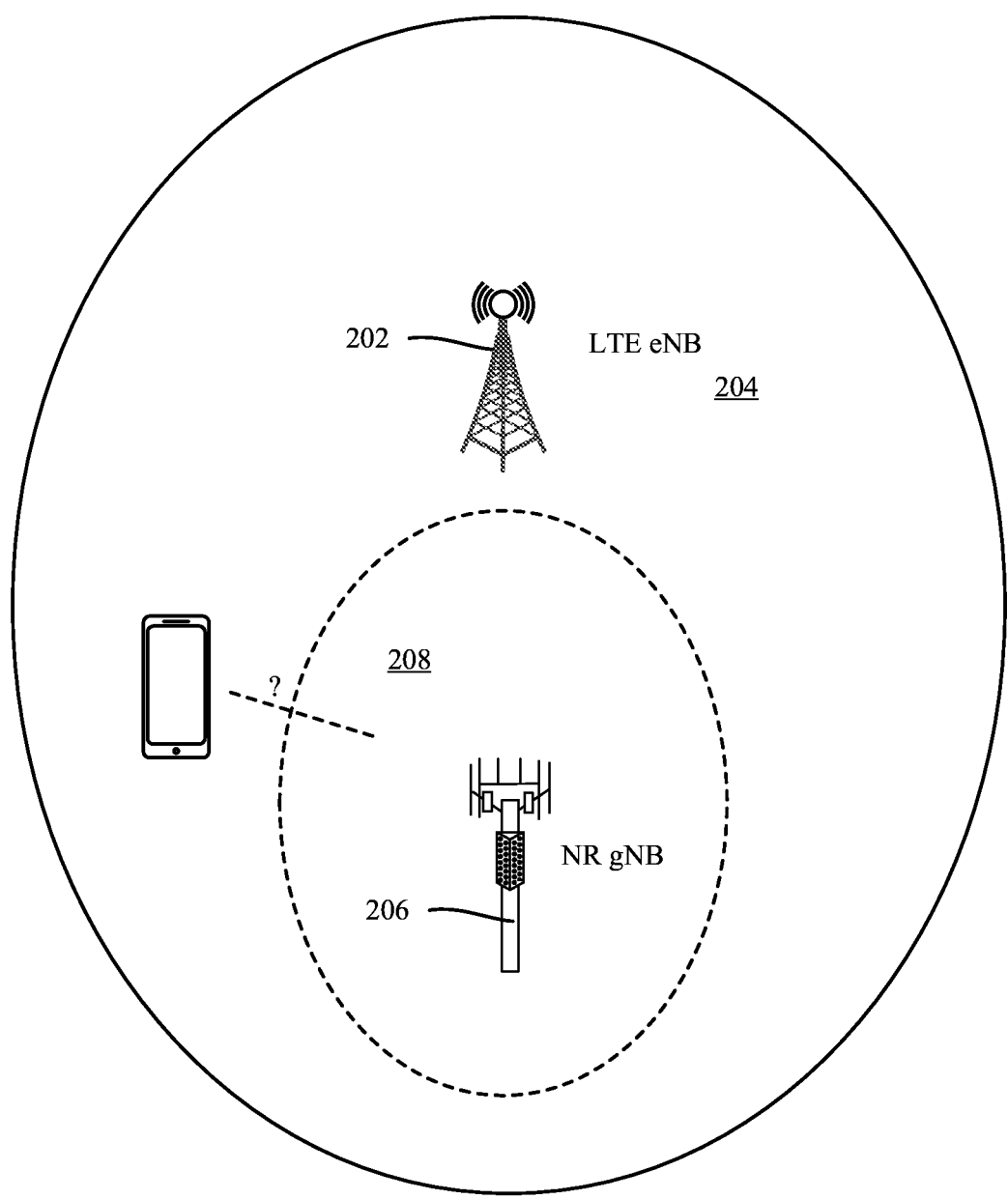
FIG. 2 illustrates a mobile device within an LTE cell that may be capable of high bandwidth (e.g., 5G+) communication, in accordance with various aspects and embodiments of the subject disclosure.

In one implementation, the mobile device maintains a fingerprint list 108 of cell identifiers (IDs) in which the mobile device 100 has previously had a sufficiently high bandwidth connection to be considered "5G+" instead of "5G". Note that other peer devices can share such information so that a device need not previously have been connected in a cell to maintain the cell's fingerprint. However, as shown in FIG. 2, a mobile device 200 that is idle may know it is within the LTE eNodeB (eNB) 202 coverage area represented by the (solid line oval) cell 204 (e.g., because the mobile device is anchored to that LTE eNB 206), but not have any connection to the NR gNodeB (gNB) 206 and thus is uncertain (the "?" accompanying the dashed line in FIG. 2) whether the device is within the coverage area represented by the (dashed line oval) cell 208. Accordingly, the selection logic 102 of FIG. 1 can be coupled to position determination logic 110, such as to determine cell radius estimation via network- and device-based positioning techniques such as (but not limited to) time of arrival, motion sensors, GPS and so forth. In this way, a derived location from the combined network/UE based positioning in conjunction with the 5G cell fingerprint (cell ID with a known carrier frequency) can provide improved accuracy with respect to determining whether to display a "5G" or "5G+" icon when idle/not connected.

Figure 3:
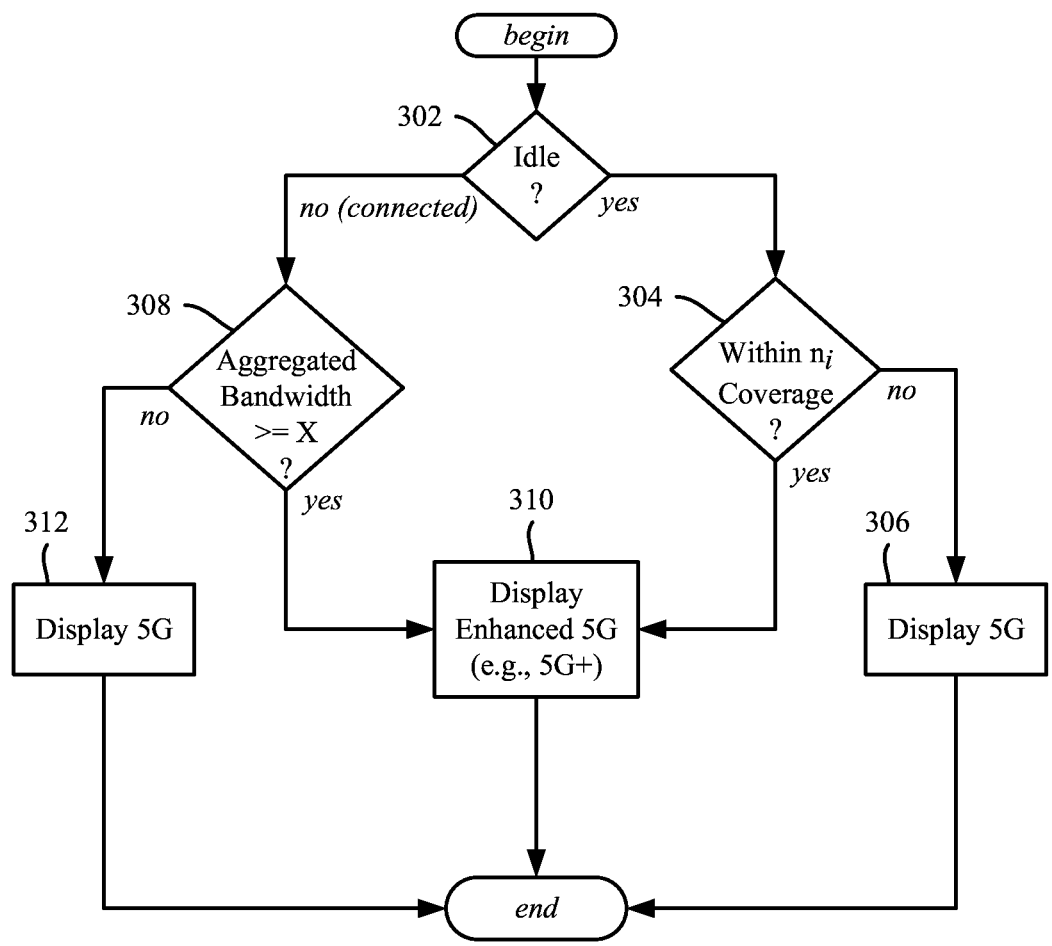
FIG. 3 is a flow diagram showing example operations of a mobile device to determine an icon to display, in accordance with various aspects and embodiments of the subject disclosure.

By way of example, consider a mobile device capable of communicating in the n77 frequency band (or any frequency band of a defined set of band(s), e.g., n77, n78, n79, referred to herein as $n_i$, where i represents a frequency carrier corresponding to a high bandwidth band that can be used for 5G+(or the like) communications. As of now, such a device can be a 5G standalone device or a non-standalone device. In general, as represented by the example operations of FIG. 3, when in the idle mode (operation 302) and within or estimated to be within a defined frequency band (e.g., n77) coverage area (operation 304), enhanced 5G (e.g., "5G+") is selected and displayed at operation 310, otherwise standard "5G" is selected and displayed at operation 306. When in the connected mode (as evaluated via operation 302), at operation 308 the aggregated bandwidth (e.g., of the primary cell (PCell) and secondary cell SCell (block 112, FIG. 1) is evaluated versus an aggregated bandwidth threshold ("floor"), e.g., equal to X, where X is defined by the mobile operator, e.g., a value on the order of 40 MHz to 100 MHz, for example, but any threshold bandwidth an operator chooses). If the aggregated bandwidth meets the aggregated bandwidth threshold, then "5G+" is selected for display (operation 310), while if below the aggregated bandwidth threshold, then "5G" is selected for display (operation 312).

It should be noted that in the above example, there is no distinction between a standalone device and a non-standalone device. However, should an operator choose to do so, there can be a different bandwidth threshold value for a standalone device (e.g., set to X) and a non-standalone device (e.g., set to Y). Similarly, there can be different threshold values for different bands, e.g., n77 can have threshold X, n78 can have threshold equal to X', and so on, as well as differences between standalone and non-standalone devices.

In an alternative implementation, which may be used instead of (or in addition to) the fingerprint-based technology described herein, an aggregated bandwidth threshold ("floor"), e.g., equal to X is similarly defined by the mobile operator (X can be the same value as X described above, but may be different). The aggregated bandwidth threshold value, along with neighbor cells 114/neighbor cell bandwidth data 116 are used to determine whether to display the "5G" or "5G+" icon when idle/not connected. By way of example, again consider a mobile device capable of communicating in the n77 frequency band. As of now, such a device can be a 5G standalone device or a non-standalone device.

In this alternative implementation, the neighbor cell list 114 (obtained via system information blocks SIB4 and/or SIB24) and their associated bandwidth data 116 is accessed when the device is in the idle mode to determine (e.g., estimate) whether the device is in the neighbor cell list and thus likely within an $n_i$ (e.g., n77) frequency band coverage area. Note that $n_i$ as used herein is not limited to the n77 frequency band, and indeed can represent multiple bands (e.g., in a list), including n78, n79 and millimeter wave FR2 bands such as n260. As with any frequency bands described herein, FR1 n77 and FR2 n260 are example bands; other FR1 bands can use the technology described herein as well, e.g., n41, n78, n79, n258 etc.

Figure 4:
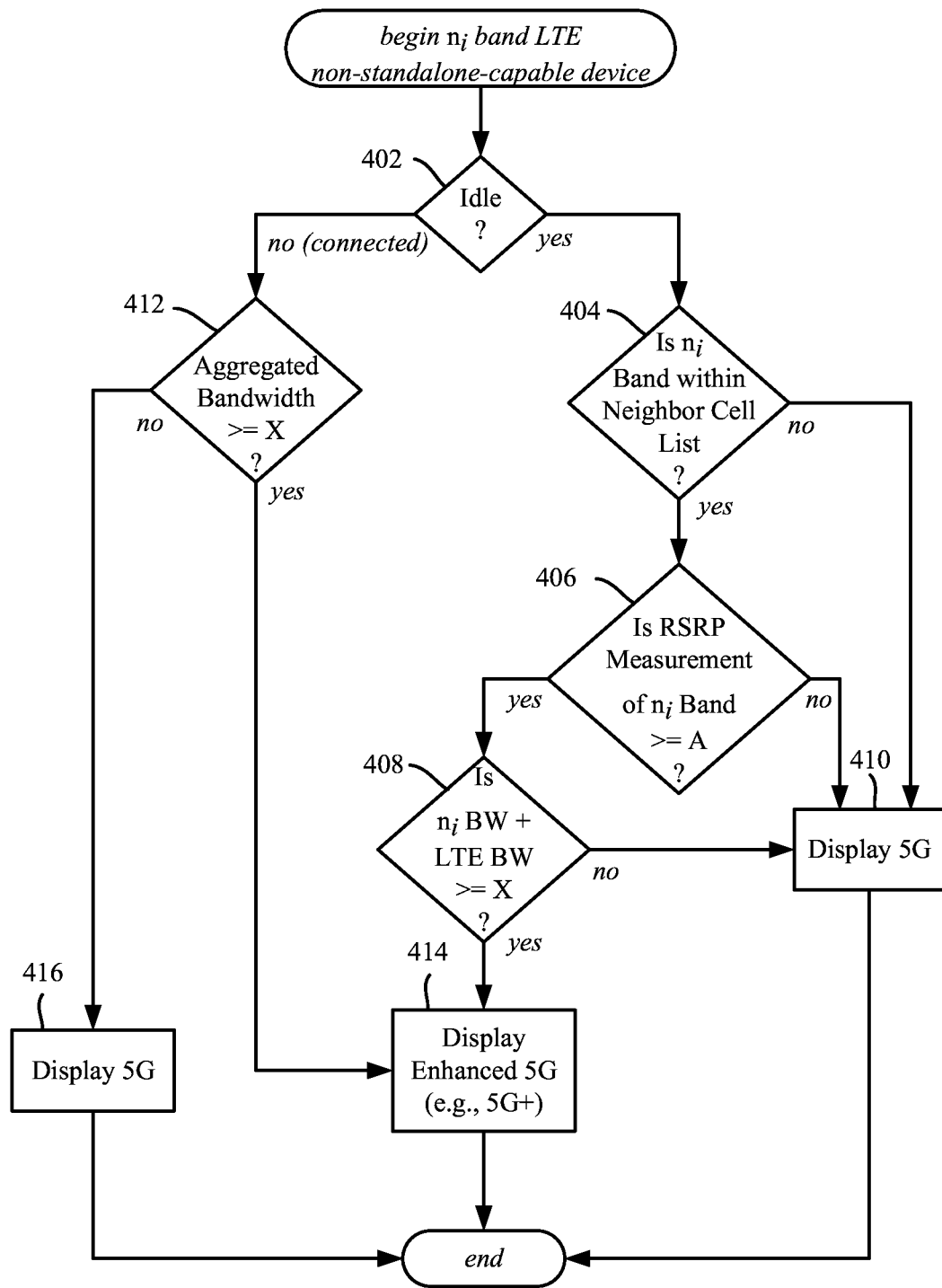
FIG. 4 is a flow diagram showing example operations of a non-standalone mobile device to determine an icon to display, in accordance with various aspects and embodiments of the subject disclosure.

In general, as represented by the example operations of FIG. 4, for a non-standalone device (pre-conditioned as being dual connectivity true), when the mobile device is in the idle mode (operation 402), operations 404, 406 and 408 (which can be in any order/logical AND operations) determine whether "5G" or 5G+ is displayed. Operation 404 evaluates whether the defined $n_i$ (e.g., n77) frequency band is within the neighbor cell list, and if not, branches to operation 410 to display the "5G" output. If so, operation 406 evaluates whether and the mobile device is within $n_i$ coverage, that is, the reference signal received power (RSRP) as measured by the mobile device is greater than or equal to a threshold RSRP value A; if not, operation 406 branches to operation 410 to display the "5G" output. If within $n_i$ coverage, operation 408 evaluates whether the LTE bandwidth plus the $n_i$ bandwidth satisfy the threshold X (or other suitable threshold value, which can be different for standalone/non-standalone/idle/connected). If operation 408 is met, enhanced 5G (e.g., "5G+") is selected and displayed at operation 414, otherwise operation 410 displays "5G".

When in the radio resource control (RRC) connected mode (as evaluated via operation 402), (pre-conditioned as being dual connectivity true), at operation 412 the aggregated bandwidth (e.g., of the primary cell (PCell) and secondary cell SCell (block 112, FIG. 1) is evaluated versus an aggregated bandwidth threshold ("floor"), e.g., equal to X, where X is defined by the mobile operator, e.g., a value on the order of 40 MHz to 100 MHz, for example, but any threshold bandwidth an operator chooses). If the aggregated bandwidth meets the aggregated bandwidth threshold, then "5G+" is selected for display (operation 414), while if below the aggregated bandwidth threshold, then "5G" is selected for display (operation 416).

The following table summarizes the technology for a non-standalone device:

| RRC State | Criteria | Indicator |
| --- | --- | --- |
| NSA idle | Pre-condition: ULI (upperLayerIndication) in SIB2 (E-UTRAN New Radio - Dual Connectivity) Alternative 1 - fingerprint cell ID from previous connected mode of $n_i$ (e.g., n77), apply timer. Use positioning techniques to improve $n_i$ coverage accuracy Alternative 2 - check LTE PCell BW AND if $n_i$ (e.g., n77) in is in neighbor cell list (SIB24 or RRC reconfig B1 meas object) AND in $n_i$ coverage (RSRP measurement results for $n_i$ satisfies threshold A) | $n_i$ (e.g., n77) in neighbor cell list AND $n_i$ RSRP measurement results >= A AND LTE BW + $n_i$ BW >= threshold X, display "5G+", otherwise display "5G". |
| NSA connected | Pre-condition: ULI in SIB2 Check aggregated BW between LTE and NR carrier | Active carriers - LTE + $n_i$ (e.g., n77) BW is greater than a threshold X, display "5G+", otherwise display "5G". |

Figure 5:
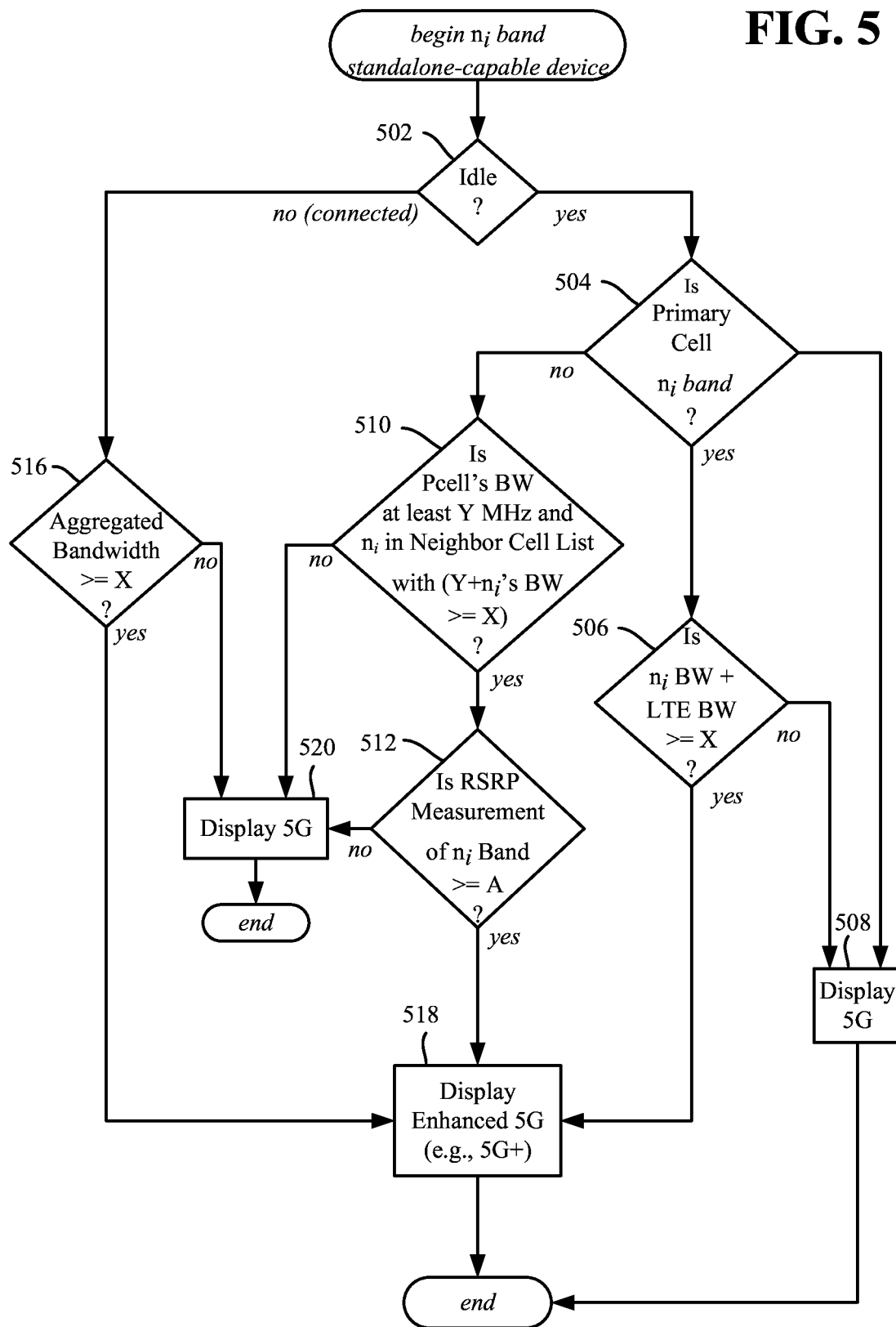
FIG. 5 is a flow diagram showing example operations of a standalone mobile device to determine an icon to display, in accordance with various aspects and embodiments of the subject disclosure.

For a non-standalone device, the example operations of FIG. 5 may be used in the alternative implementation. When a non-standalone mobile device is in the idle mode as evaluated at operation 502, operation 504 evaluates whether the primary cell (PCell) is in the $n_i$ band, e.g., n77 is the PCell. If so, operation 506 is performed, which evaluates whether the secondary cell bandwidth (e.g., FDD, or frequency division duplex) in the neighbor cell list has Q MHz bandwidth, e.g., 10 MHz bandwidth for n66, 10 MHz bandwidth for n5 (once 3G is no longer used), and so on, such that the ni bandwidth plus the LTE bandwidth satisfies the bandwidth threshold X. If not, operation 508 selects and displays the "5G" icon, otherwise if so, operation 518 selects and displays the enhanced "5G+" icon in this example.

Returning to operation 504, if the primary cell was not in the $n_i$ (e.g., n77) band, it is still possible that the device has the potential to operate in the 5G+ mode, if the primary cell's bandwidth when added to the bandwidth of an $n_i$ (if any) neighbor cell meets the threshold floor of X. Operation 510 evaluates whether the primary cell's bandwidth (BW) is a minimum or Y MHz and that the $n_i$ (e.g., n77) band is in the neighbor cell list, with the Y bandwidth value plus the ni (e.g., n77) bandwidth value evaluated against the threshold bandwidth floor. If these conditions are not met, operation 520 displays "5G" because the potential for high bandwidth is not present. If met, operation 512 evaluates whether the mobile device is within $n_i$'s coverage (RSRP>threshold A), and if so, operation 518 displays 5G+, otherwise operation 520 displays "5G" in this example.

Returning to operation 502 when the device is in the connected mode, operation 516 evaluates whether the aggregated bandwidth (e.g., regardless of whether FDD or $n_i$ is the PCell) requirement of greater than or equal to the threshold floor value of X (operation 516) is met. If so, operation 518 is performed to select and display the "5G+" icon. If the bandwidth threshold is not met, operation 520 displays the "5G" icon.

The following table summarizes the technology for a standalone device:

| RRC State | Criteria | Indicator |
|---|---|---|
| SA idle | $n_i$ (e.g., n77) as Pcell, check FDD carrier in neighbor cell list (SIB4) | $n_i$ (e.g., n77) + LTE BW >= threshold X display 5G+, else 5G |
| | FDD as Pcell, check $n_i$ (e.g., n77) in neighbor cell list (SIB4) AND in $n_i$ coverage (RSRP measurement results for $n_i$ satisfies threshold A) | $n_i$ (e.g., n77) in neighbor cell list AND $n_i$ RSRP measurement results > A AND LTE + n77 BW >= threshold X display 5G+, otherwise 5G |
| SA connected | (Either $n_i$ (e.g., n77) or FDD as PCell), check aggregated BW. | Active carriers - FDD + $n_i$ (e.g., n77) BW >= X display "5G+", otherwise display "5G". |

Figure 6:
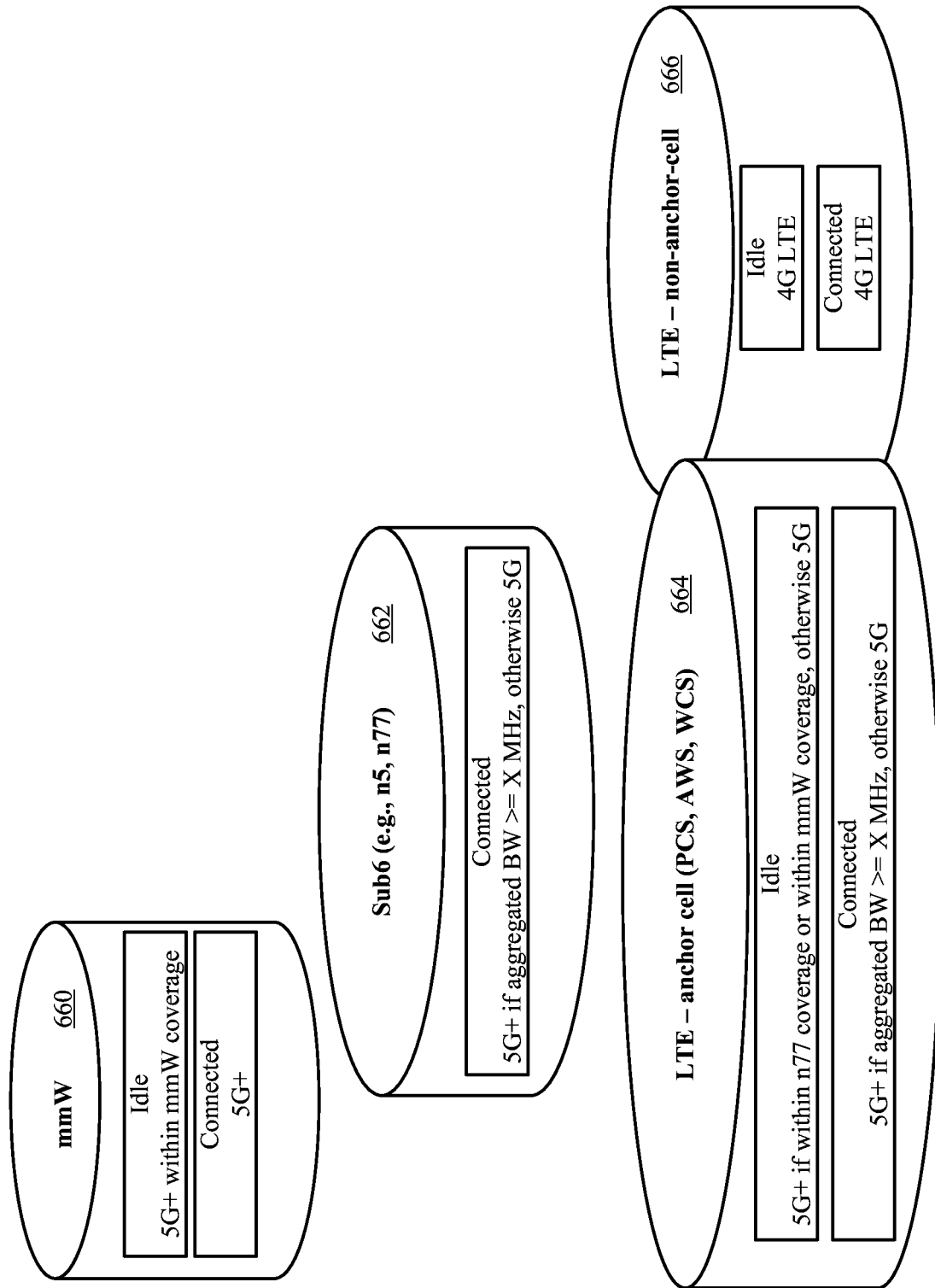
FIG. 6 is an example representation of a 5G non-standalone mobile device frequency bands summarizing the display of an icon representing wireless technology current availability, in accordance with various aspects and embodiments of the subject disclosure.

FIG. 6 summarizes use case examples for a 5G non-standalone device. As can be seen, within mmWave coverage (block 660), "5G+" is displayed. When connected in a Sub6 band (block 662), "5G+" is displayed if the aggregated bandwidth meets the defined threshold bandwidth of X, otherwise "5G" is displayed. When LTE is the anchor cell (e.g., PCS, AWS or WCS bands) as shown via block 664, "5G+" is displayed when the device is in the idle mode and is within $n_i$ coverage; e.g., n77 (as in the example of FIG. 6) or mmWave coverage. Otherwise "5G" is displayed. When connected, "5G+" is displayed if the aggregated bandwidth meets the defined threshold bandwidth of X, otherwise "5G" is displayed. When only LTE is present as a non-anchor cell as represented via block 666, LTE is displayed in idle or connected mode.

Figure 7:
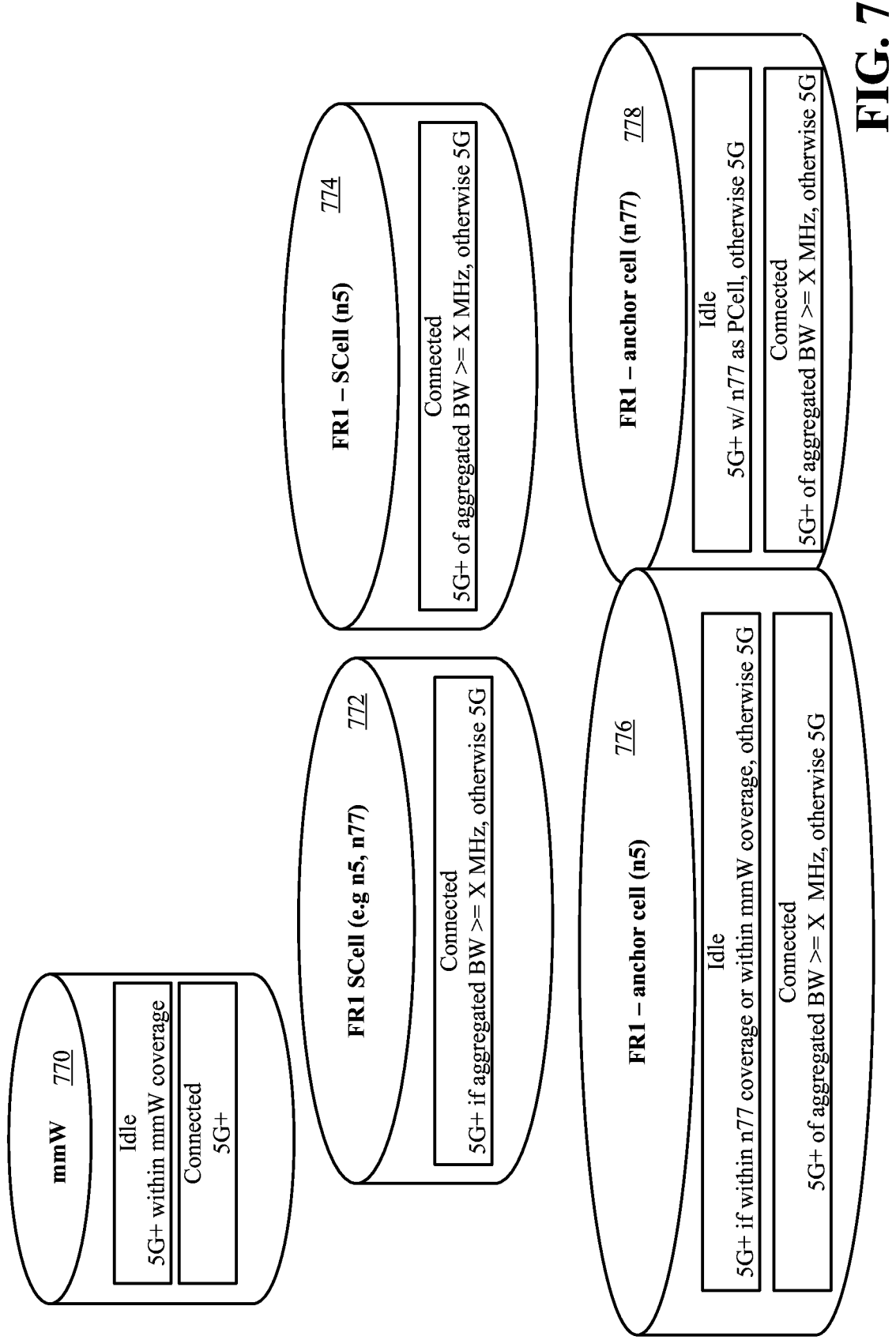
FIG. 7 is an example representation of a 5G standalone mobile device frequency bands summarizing the display of an icon representing wireless technology current availability, in accordance with various aspects and embodiments of the subject disclosure.

FIG. 7 summarizes use case examples for a 5G non-standalone device. As can be seen, within mmWave coverage (block 770), "5G+" is displayed. When connected in a FR1 secondary cell (SCell, block 772 or block 774), "5G+" is displayed if the aggregated bandwidth meets the defined threshold bandwidth of X, otherwise "5G" is displayed. When FR1 is the anchor cell and is the n5 band, as shown via block 776, "5G+" is displayed when the device is in the idle mode and is within $n_i$ coverage; e.g., n77 (as in the example of FIG. 6) or mmWave coverage. Otherwise "5G" is displayed. When connected, "5G+" is displayed if the aggregated bandwidth meets the defined threshold bandwidth of X, otherwise "5G" is displayed.

When the FR1 band is the anchor cell and the band is an $n_i$ band (e.g., n77 in the example of FIG. 7), if the $n_i$ (e.g., n77) band is the primary cell, "5G+" is displayed, otherwise 5G is displayed. When connected, "5G+" is displayed if the aggregated bandwidth meets the defined threshold bandwidth of X, otherwise "5G" is displayed.

Returning to FIG. 1, any time a device enters the idle mode, a timer 118 can be associated with the current "5G+" (or the "5G") icon display. In general, the timer operates to avoid a "ping-pong" situation in which the icon rapidly changes from "5G+" to "5G" or vice-versa. For example, the timer(s) expiration duration(s) (note that there can be different times, one for 5G to 5G+, another for 5G+ to 5G) can be defined by the operator, or possibly overridden by the user. A typical expiration time is on the order of minutes (e.g., 30 minutes), however an expiration time can be in seconds (e.g., 30 seconds). When in the connected mode the actual technology in use (5G or 5G+) is known, however it is also feasible to have a similar (e.g., shorter duration) timer avoid a scenario in which a device is going in and out of 5G+ coverage and rapidly changes icons, which can be annoying to view.

Figure 8:
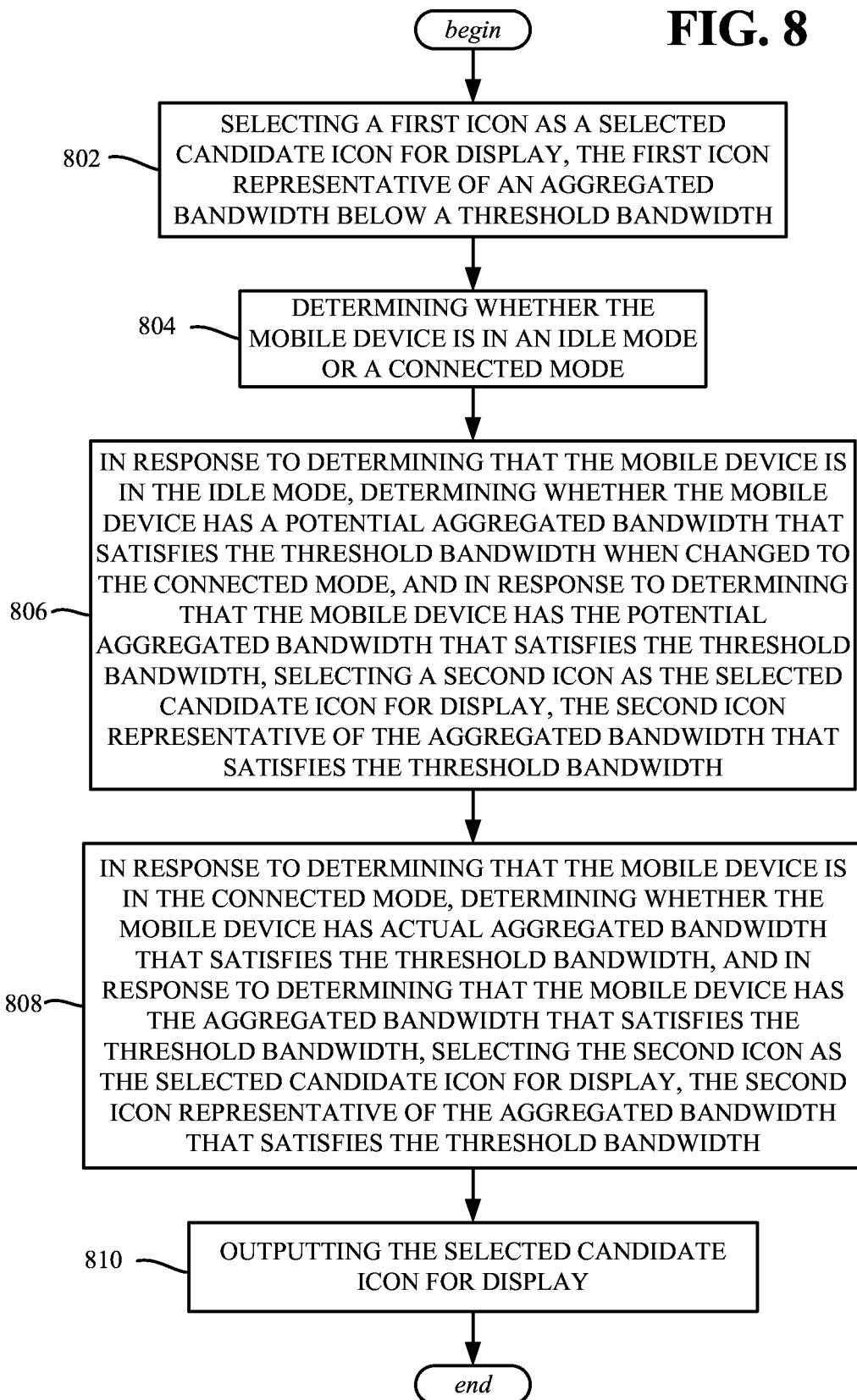
FIG. 8 is a flow diagram showing example operations related to selecting an icon to display based on idle versus connected modes and cell-related data, in accordance with various aspects and embodiments of the subject disclosure.

One or more aspects are represented in FIG. 8, and can comprise example operations, e.g., of a mobile device, such as of a method, and/or a processor and a memory that stores executable instructions that, when executed by the processor, facilitate performance of the example operations, and/or a machine-readable medium, comprising executable instructions that, when executed by a processor, facilitate performance of the example operations. Operation 802 represents selecting a first icon as a selected candidate icon for display, the first icon representative of an aggregated bandwidth below a threshold bandwidth. Operation 804 represents determining whether the mobile device is in an idle mode or a connected mode. Operation 806 represents, in response to determining that the mobile device is in the idle mode, determining whether the mobile device has a potential aggregated bandwidth that satisfies the threshold bandwidth when changed to the connected mode, and in response to determining that the mobile device has the potential aggregated bandwidth that satisfies the threshold bandwidth, selecting a second icon as the selected candidate icon for display, the second icon representative of the aggregated bandwidth that satisfies the threshold bandwidth. Operation 808 represents, in response to determining that the mobile device is in the connected mode, determining whether the mobile device has actual aggregated bandwidth that satisfies the threshold bandwidth, and in response to determining that the mobile device has the aggregated bandwidth that satisfies the threshold bandwidth, selecting the second icon as the selected candidate icon for display, the second icon representative of the aggregated bandwidth that satisfies the threshold bandwidth. Operation 810 represents outputting the selected candidate icon for display.

The mobile device can be in the idle mode, and wherein the determining that the mobile device has the potential aggregated bandwidth that satisfies the threshold bandwidth comprises matching a cell identifier corresponding to a coverage area that the mobile device is within to a cell identifier maintained on the mobile device. Further operations can include estimating a position within the coverage area corresponding to the cell identifier.

The mobile device can be in the idle mode, and determining that the mobile device has the potential aggregated bandwidth that satisfies the threshold bandwidth can include recognizing a neighbor cell frequency band in a neighbor cell list.

The neighbor cell frequency band in the neighbor cell list can correspond to at least one of: an n77 band or an FR2 millimeter wave band.

Further operations can include associating a timer with the outputting of the selected candidate icon, the timer controlling a rate of change of the selected candidate icon when in the idle mode.

The mobile device can be a new radio standalone-capable device including a capability to communicate according to a fifth generation communication network protocol.

The first icon can represent a first capability to communicate according to a fifth generation (5G) communication network protocol, and the second icon can represent the second capability to communicate according to a fifth generation plus (5G+) communication network protocol.

The mobile device can be in the idle mode, the mobile device can be a standalone-capable device comprising a capability to communicate according to a fifth generation communication network protocol, and determining that the mobile device has the potential aggregated bandwidth that satisfies the threshold bandwidth can include recognizing that the mobile device is anchored to a specified primary cell associated with a high bandwidth, and that a cell in a neighbor cell list has a bandwidth that satisfies a neighbor cell threshold value.

The mobile device can be in the idle mode, the mobile device can be a standalone-capable device comprising a capability to communicate according to a fifth generation communication network protocol, and determining that the mobile device has the potential aggregated bandwidth that satisfies the threshold bandwidth can include recognizing that the mobile device is not anchored to a specified primary cell associated with high bandwidth, recognizing that the specified primary cell satisfies a minimum threshold value, and that a cell in a neighbor cell list is a specified cell associated with high bandwidth.

The mobile device can be in the connected mode, and determining that the mobile device has the actual aggregated bandwidth that satisfies the threshold bandwidth can include determining that the mobile device is in a specified cell associated with high bandwidth.

Figure 9:
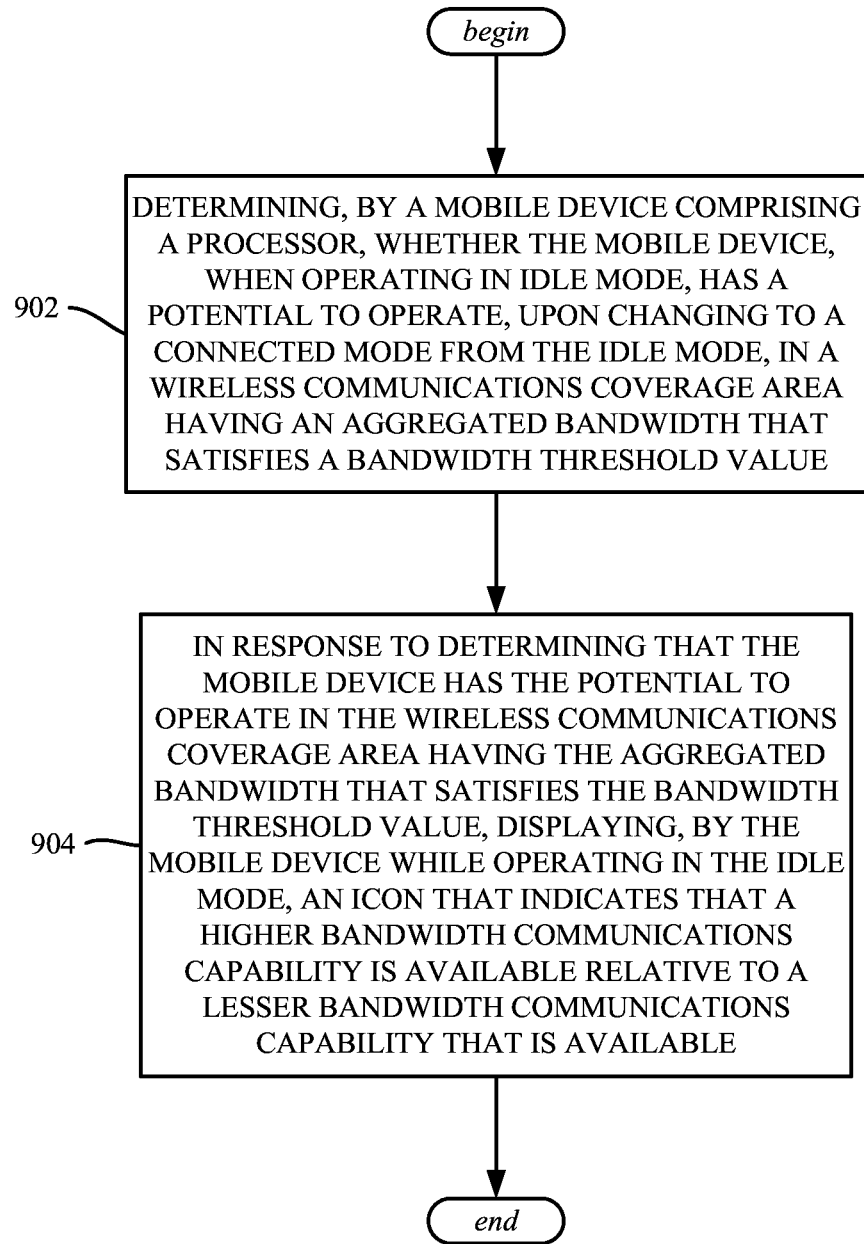
FIG. 9 is a flow diagram showing example operations related to selecting an icon to display, when a mobile device is in an idle mode, based on cell-related data, in accordance with various aspects and embodiments of the subject disclosure.

One or more aspects are represented in FIG. 9, and can comprise example operations, such as of a method, or a processor and a memory that stores executable instructions that, when executed by the processor, facilitate performance of the example operations, or a machine-readable medium, comprising executable instructions that, when executed by a processor, facilitate performance of the example operations. Operation 902 represents determining, by a mobile device comprising a processor, whether the mobile device, when operating in idle mode, has a potential to operate, upon changing to a connected mode from the idle mode, in a wireless communications coverage area having an aggregated bandwidth that satisfies a bandwidth threshold value. Operation 902 represents, in response to determining that the mobile device has the potential to operate in the wireless communications coverage area having the aggregated bandwidth that satisfies the bandwidth threshold value, displaying, by the mobile device while operating in the idle mode, an icon that indicates that a higher bandwidth communications capability is available relative to a lesser bandwidth communications capability that is available.

Determining that the mobile device has the potential to operate in the coverage area having the aggregated bandwidth that satisfies the bandwidth threshold value can include determining that the mobile device is within a coverage area corresponding to a long term evolution cell having a first bandwidth, and that the mobile device is located at a position within the long term evolution cell corresponding to a fifth generation cell having a carrier frequency corresponding to a second bandwidth that, when aggregated with the first bandwidth, satisfies the bandwidth threshold value.

The mobile device can be operating in the idle mode in a non-standalone mode anchored to a long term evolution cell primary cell having a first bandwidth, and determining that the mobile device has the potential to operate in the coverage area having the aggregated bandwidth that satisfies the bandwidth threshold value can include accessing a neighbor cell list to identify a neighbor cell having a defined carrier frequency.

The mobile device can be operating in the idle mode in a standalone mode anchored to a primary cell having a defined carrier frequency, and determining that the mobile device has the potential to operate in the coverage area having the aggregated bandwidth that satisfies the bandwidth threshold value can include accessing a neighbor cell list to identify a neighbor cell that satisfies a predetermined minimum bandwidth.

The mobile device is operating in the idle mode in a standalone mode anchored to a primary cell having a carrier frequency corresponding to a first bandwidth, and determining that the mobile device has the potential to operate in the coverage area having the aggregated bandwidth that satisfies the bandwidth threshold value can include accessing a neighbor cell list to identify a neighbor cell having a carrier frequency corresponding to a second bandwidth, and aggregating the first bandwidth with the second bandwidth to obtain the aggregated bandwidth that satisfies the bandwidth threshold value.

Figure 10:
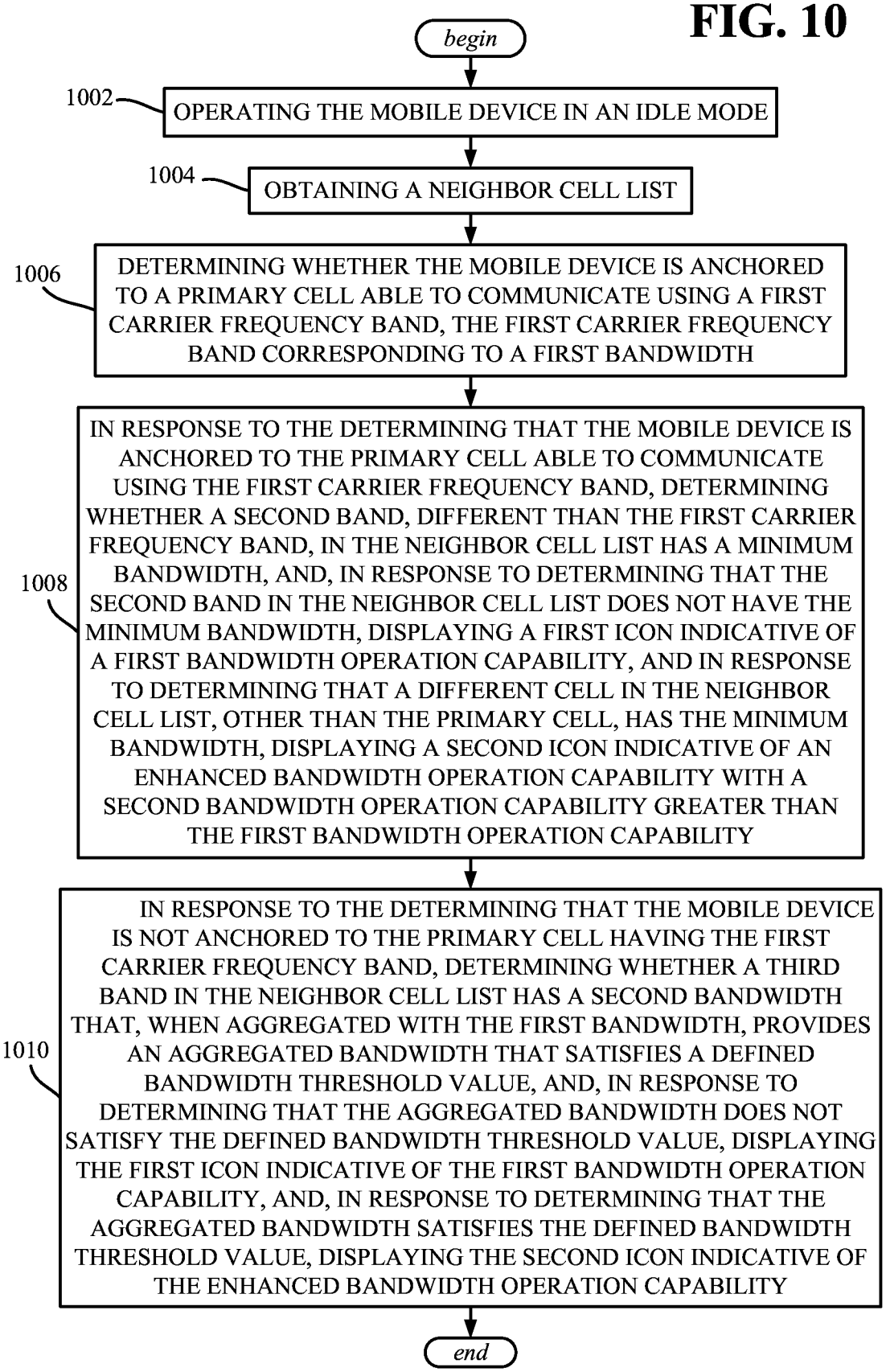
FIG. 10 is a flow diagram showing example operations related to selecting an icon to display, when a mobile device is in an idle mode, based on cell-related data including neighbor cell information, in accordance with various aspects and embodiments of the subject disclosure.

One or more aspects are represented in FIG. 10, and can comprise example operations, such as of a method, or a processor and a memory that stores executable instructions that, when executed by the processor, facilitate performance of the example operations, or a machine-readable medium, comprising executable instructions that, when executed by a processor, facilitate performance of the example operations. Operation 1002 represents operating the mobile device in an idle mode. Operation 1004 represents obtaining a neighbor cell list. Operation 1006 represents determining whether the mobile device is anchored to a primary cell able to communicate using a first carrier frequency band, the first carrier frequency band corresponding to a first bandwidth. Operation 1008 represents, in response to the determining that the mobile device is anchored to the primary cell able to communicate using the first carrier frequency band, determining whether a second band, different than the first carrier frequency band, in the neighbor cell list has a minimum bandwidth, and, in response to determining that the second band in the neighbor cell list does not have the minimum bandwidth, displaying a first icon indicative of a first bandwidth operation capability, and in response to determining that a different cell in the neighbor cell list, other than the primary cell, has the minimum bandwidth, displaying a second icon indicative of an enhanced bandwidth operation capability with a second bandwidth operation capability greater than the first bandwidth operation capability, Operation 1010 represents, in response to the determining that the mobile device is not anchored to the primary cell having the first carrier frequency band, determining whether a third band in the neighbor cell list has a second bandwidth that, when aggregated with the first bandwidth, provides an aggregated bandwidth that satisfies a defined bandwidth threshold value, and, in response to determining that the aggregated bandwidth does not satisfy the defined bandwidth threshold value, displaying the first icon indicative of the first bandwidth operation capability, and, in response to determining that the aggregated bandwidth satisfies the defined bandwidth threshold value, displaying the second icon indicative of the enhanced bandwidth operation capability.

The second icon can be displayed, and further operations can include associating a timer with the displaying of the second icon, evaluating the timer, determining that the timer indicates a time expired condition, and, in response to determining that the timer indicates the time expired condition, displaying the first icon instead of the second icon.

The aggregated bandwidth can be a first aggregated bandwidth corresponding to the idle mode, and further operations can include operating the mobile device in a connected mode, determining that the mobile device is connected to a cell able to communicate using the first carrier frequency band, determining whether a second aggregated bandwidth corresponding to the connected mode satisfies the defined bandwidth threshold value, and, in response to determining that the second aggregated bandwidth does not satisfy the defined bandwidth threshold value, displaying the first icon indicative of the first bandwidth operation capability, and, in response to determining that the aggregated bandwidth satisfies the defined bandwidth threshold value, displaying the second icon indicative of the enhanced bandwidth operation capability. The first carrier frequency band can comprise a 5G n77 band of C-band spectrum.

As can be seen, the technology described herein provides the ability to show different 5G indicators for different frequency band and aggregated bandwidth, and facilitates a single band new radio device and/or a multi-band new radio device to distinguish between single band and multi-band cells. The technology shows an accurate indicator in idle mode and connected mode, reduces ping-pong of indicator displays, shows correct indicator matching the actual 5G cell coverage and can adaptively updating the estimated 5G cell radius. While the examples showed While the above description used millimeter wave (e.g., n260) and n77 frequency bands in many of the examples, the technology can be extended to any other frequency bands. Similarly, while "5G" or "5G+" indicators were used in many of the examples, the technology can substitute other indicators, such as used by different operators.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 11:
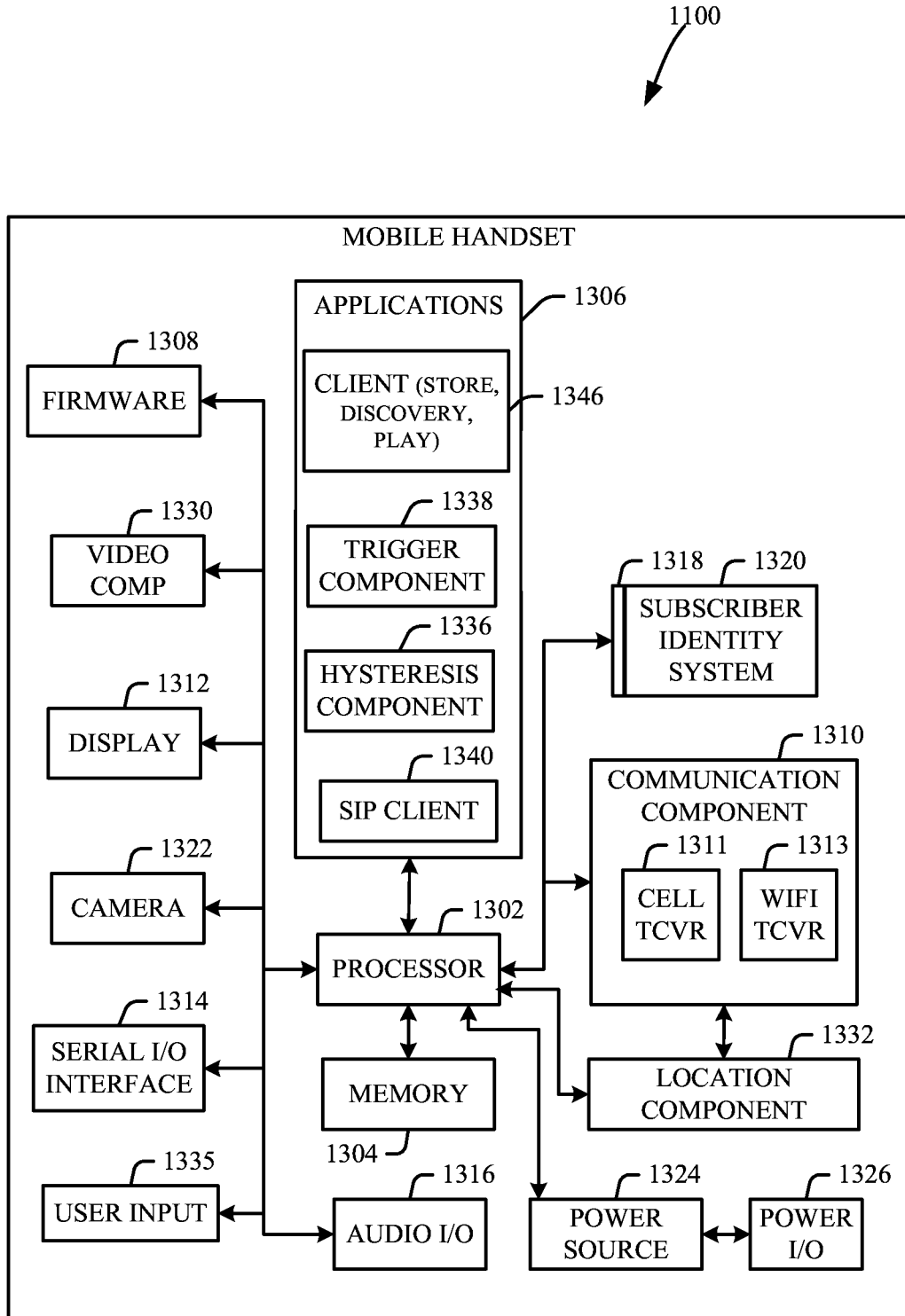
FIG. 11 illustrates an example block diagram of example user equipment that can be a mobile handset in accordance with various aspects and embodiments of the subject disclosure.

Referring now to FIG. 11, illustrated is a schematic block diagram of an example end-user device such as a user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
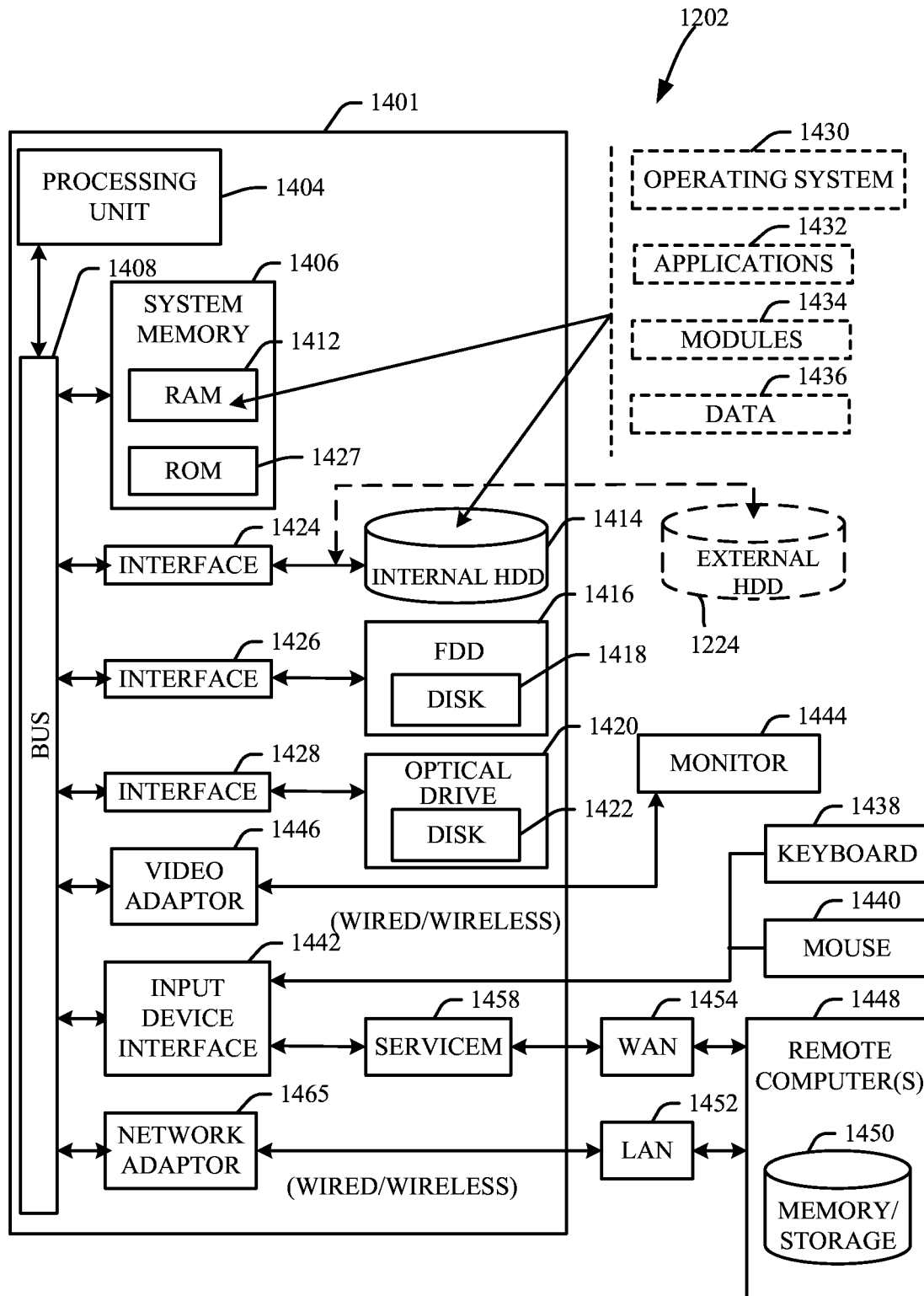
FIG. 12 illustrates an example block diagram of a computer that can be operable to execute processes and methods in accordance with various aspects and embodiments of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown).

Additionally, while not shown in environment 1200, a solid state drive (SSD), non-volatile memory and other storage technology could be used in addition to, or in place of, an HDD 1214, and can be internal or external. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally include emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can include one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1194 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A mobile device, comprising:
a processor; and
a memory that stores executable instructions which, when executed by the processor of the system, facilitate performance of operations, the operations comprising:
selecting a first icon as a selected candidate icon for display, the first icon representative of an aggregated bandwidth below a threshold bandwidth;
determining whether the mobile device is in an idle mode or a connected mode;
in response to determining that the mobile device is in the idle mode, determining whether the mobile device has a potential aggregated bandwidth that satisfies the threshold bandwidth when changed to the connected mode, and in response to determining that the mobile device has the potential aggregated bandwidth that satisfies the threshold bandwidth, selecting a second icon as the selected candidate icon for display, the second icon representative of the aggregated bandwidth that satisfies the threshold bandwidth;
in response to determining that the mobile device is in the connected mode, determining whether the mobile device has actual aggregated bandwidth that satisfies the threshold bandwidth, and in response to determining that the mobile device has the aggregated bandwidth that satisfies the threshold bandwidth, selecting the second icon as the selected candidate icon for display, the second icon representative of the aggregated bandwidth that satisfies the threshold bandwidth; and outputting the selected candidate icon for display.

2. The mobile device of claim 1, wherein the mobile device is in the idle mode, and wherein the determining that the mobile device has the potential aggregated bandwidth that satisfies the threshold bandwidth comprises matching a cell identifier corresponding to a coverage area that the mobile device is within to a cell identifier maintained on the mobile device.

3. The mobile device of claim 2, wherein the operations further comprise estimating a position within the coverage area corresponding to the cell identifier.

4. The mobile device of claim 1, wherein the mobile device is in the idle mode, and wherein the determining that the mobile device has the potential aggregated bandwidth that satisfies the threshold bandwidth comprises recognizing a neighbor cell frequency band in a neighbor cell list.

5. The mobile device of claim 4, wherein the neighbor cell frequency band in the neighbor cell list corresponds to an n77 band.

6. The mobile device of claim 1, wherein the operations further comprise associating a timer with the outputting of the selected candidate icon, the timer controlling a rate of change of the selected candidate icon when in the idle mode.

7. The mobile device of claim 1, wherein the mobile device is a new radio standalone-capable device comprising a capability to communicate according to a fifth generation communication network protocol.

8. The mobile device of claim 1, wherein the first icon represents a first capability to communicate according to a fifth generation (5G) communication network protocol, and the second icon represents a second capability to communicate according to a fifth generation plus (5G+) communication network protocol.

9. The mobile device of claim 1, wherein the mobile device is in the idle mode, wherein the mobile device is a standalone-capable device comprising a capability to communicate according to a fifth generation communication network protocol, and wherein the determining that the mobile device has the potential aggregated bandwidth that satisfies the threshold bandwidth comprises recognizing that the mobile device is anchored to a specified primary cell associated with a high bandwidth, and that a cell in a neighbor cell list has a bandwidth that satisfies a neighbor cell threshold value.

10. The mobile device of claim 1, wherein the mobile device is in the idle mode, wherein the mobile device is a standalone-capable device comprising a capability to communicate according to a fifth generation communication network protocol, and wherein the determining that the mobile device has the potential aggregated bandwidth that satisfies the threshold bandwidth comprises recognizing that the mobile device is not anchored to a specified primary cell associated with high bandwidth, recognizing that the specified primary cell satisfies a minimum threshold value, and that a cell in a neighbor cell list is a specified cell associated with high bandwidth.

11. The mobile device of claim 1, wherein the mobile device is in the connected mode, and wherein the determining that the mobile device has the actual aggregated bandwidth that satisfies the threshold bandwidth comprises determining that the mobile device is in a specified cell associated with high bandwidth.

12. A method, comprising:

selecting, by a user equipment comprising a processor, a first icon as a selected candidate icon for display, the first icon representative of an aggregated bandwidth below a threshold bandwidth;

determining, by the user equipment, whether the user equipment is in an idle mode or a connected mode;

in response to determining that the user equipment is in the idle mode, determining, by the user equipment, whether the user equipment has a potential aggregated bandwidth that satisfies the threshold bandwidth when changed to the connected mode, and in response to determining that the user equipment has the potential aggregated bandwidth that satisfies the threshold bandwidth, selecting a second icon as the selected candidate icon for display, the second icon representative of the aggregated bandwidth that satisfies the threshold bandwidth;

in response to determining that the user equipment is in the connected mode, determining, by the user equipment, whether the user equipment has actual aggregated bandwidth that satisfies the threshold bandwidth, and in response to determining that the user equipment has the aggregated bandwidth that satisfies the threshold bandwidth, selecting the second icon as the selected candidate icon for display, the second icon representative of the aggregated bandwidth that satisfies the threshold bandwidth; and outputting, by the user equipment, the selected candidate icon for display.

13. The method of claim 12, wherein the user equipment is in the idle mode, and wherein the determining that the user equipment has the potential aggregated bandwidth that satisfies the threshold bandwidth comprises matching a cell identifier corresponding to a coverage area that the user equipment is within to a cell identifier maintained on the user equipment.

14. The method of claim 12, further comprising estimating, by the user equipment, a position within the coverage area corresponding to the cell identifier.

15. The method of claim 12, wherein the user equipment is in the idle mode, and wherein the determining that the user equipment has the potential aggregated bandwidth that satisfies the threshold bandwidth comprises recognizing a neighbor cell frequency band in a neighbor cell list.

16. The method of claim 15, wherein the neighbor cell frequency band in the neighbor cell list corresponds to an FR2 millimeter wave band.

17. A non-transitory machine-readable medium, comprising executable instructions that, when executed by a processor of a user device, facilitate performance of operations, the operations comprising:

selecting a first icon as a selected candidate icon for display, the first icon representative of an aggregated bandwidth below a threshold bandwidth;

determining whether the user device is in an idle mode or a connected mode;

in response to determining that the user device is in the idle mode, determining whether the user device has a potential aggregated bandwidth that satisfies the threshold bandwidth when changed to the connected mode, and in response to determining that the user device has the potential aggregated bandwidth that satisfies the threshold bandwidth, selecting a second icon as the selected candidate icon for display, the second icon representative of the aggregated bandwidth that satisfies the threshold bandwidth;

in response to determining that the user device is in the connected mode, determining whether the user device has actual aggregated bandwidth that satisfies the threshold bandwidth, and in response to determining that the user device has the aggregated bandwidth that satisfies the threshold bandwidth, selecting the second icon as the selected candidate icon for display, the second icon representative of the aggregated bandwidth that satisfies the threshold bandwidth; and outputting the selected candidate icon for display.

18. The non-transitory machine-readable medium of claim 17, wherein the operations further comprise associating a timer with the outputting of the selected candidate icon, the timer controlling a rate of change of the selected candidate icon when in the idle mode.

19. The non-transitory machine-readable medium of claim 17, wherein the user device is in the idle mode, wherein the user device is a standalone-capable device comprising a capability to communicate according to a fifth generation communication network protocol, and wherein the determining that the user device has the potential aggregated bandwidth that satisfies the threshold bandwidth comprises:

recognizing that the user device is anchored to a specified primary cell associated with a high bandwidth, and that a cell in a neighbor cell list has a bandwidth that satisfies a neighbor cell threshold value, or recognizing that the user device is not anchored to the specified primary cell, recognizing that the specified primary cell satisfies a minimum threshold value, and that the cell in the neighbor cell list is a specified cell associated with high bandwidth.

20. The non-transitory machine-readable medium of claim 17, wherein the user device is in the connected mode, and wherein the determining that the user device has the actual aggregated bandwidth that satisfies the threshold bandwidth comprises determining that the user device is in a specified cell associated with high bandwidth.

* * * * *